United States Patent
DeLuca

(10) Patent No.: US 7,175,098 B2
(45) Date of Patent: Feb. 13, 2007

(54) REMOVABLE PROGRAMMABLE THERMOSTAT FOR AIR CONDITIONING AND HEATING SYSTEMS

(75) Inventor: Michael R. DeLuca, Mt. Laurel, NJ (US)

(73) Assignee: Lux Products Corporation, Mt. Laurel, NJ (US)

( * ) Notice: Subject to any disclaimer, the term of this patent is extended or adjusted under 35 U.S.C. 154(b) by 235 days.

(21) Appl. No.: 10/681,475

(22) Filed: Oct. 8, 2003

(65) Prior Publication Data

US 2005/0077365 A1   Apr. 14, 2005

(51) Int. Cl.
F24F 11/053 (2006.01)
G05D 23/12 (2006.01)
G05D 23/185 (2006.01)
G05D 23/00 (2006.01)

(52) U.S. Cl. .................. 236/1 C; 236/51; 236/46 R
(58) Field of Classification Search ............... 236/1 C, 236/51, 46 R
See application file for complete search history.

(56) References Cited

U.S. PATENT DOCUMENTS

| | | | |
|---|---|---|---|
| 4,032,069 A | 6/1977 | Cannella et al. | |
| 4,341,345 A | 7/1982 | Hammer et al. | |
| 4,382,544 A | 5/1983 | Stewart | |
| 5,348,078 A | 9/1994 | Dushane et al. | |
| 5,462,225 A | 10/1995 | Massara et al. | |
| 5,590,831 A | 1/1997 | Manson et al. | |
| 5,839,654 A * | 11/1998 | Weber | 236/47 |
| 5,921,099 A | 7/1999 | Lee | |
| 5,927,599 A * | 7/1999 | Kath | 236/47 |
| 5,934,096 A * | 8/1999 | Munson et al. | 62/298 |
| 6,334,317 B1 | 1/2002 | Bougauchi et al. | |
| 2003/0066897 A1* | 4/2003 | Carner et al. | 236/51 |

OTHER PUBLICATIONS

Cambridge Advanced Learner's Dictionary, 2006, http://dictionary.cambridge.org.*

* cited by examiner

*Primary Examiner*—Cheryl Tyler
*Assistant Examiner*—B. Clayton McCraw
(74) *Attorney, Agent, or Firm*—DLA Piper US LLP

(57) ABSTRACT

The invention is directed to temperature control system in which a programmable controller may be programmed to control a thermal output of said temperature-modifying device having a power connector. The programmable temperature control system may include at least one power coupler for removeably engaging the power connector from the temperature-modifying device. The programmable controller may be electrically coupled to the at least one power coupler and programmed to control the operation of the at least one temperature modifying device in response to the comparison of a measured temperature with at least one set point temperature. The power coupler may comprise one or more electrical outlets on the programmable temperature control system, for example, that may be used to individually control heating and cooling devices. The power controller may also include an power coupler for removeably engaging a power supply, such as an electrical outlet.

21 Claims, 5 Drawing Sheets

REMOVABLE PROGRAMMABLE THERMOSTAT FOR AIR CONDITIONING AND HEATING SYSTEMS

FIELD OF THE INVENTION

The field of the invention is that of programmable thermostats for controlling a heating and/or cooling system, and more particularly to a removable programmable thermostats for air conditioning and heating systems.

BACKGROUND OF THE INVENTION

It has been a longstanding problem in the heating and cooling of homes and offices to efficiently regulate the ambient temperature to maintain the desired comfort level, while minimizing the amount of energy expended by the heating/cooling apparatus. The heating/cooling needs of a home or office are not constant over time and may, in fact, vary substantially depending on the time of day or day of the week. Conventional mechanical thermostats have been highly inefficient in this regard due to the fact that only one set temperature could be maintained.

In response to this, programmable (digital) thermostats were developed in the prior art that allowed for the programming of one or more set points for the thermostat, such as based upon the time of day or day of the week. These programmable thermostats utilize a microprocessor into which the user inputs the desired temperature setting information by way of a keypad or some other arrangement of buttons and switches.

Typically, these programmable thermostats are connected to an temperature-modifying device used to control an entire structure, such as residential or commercial heating ventilation and air conditioning ("HVAC") systems, geothermal systems, gas, natural gas, or electric furnaces or water heaters, etc. The thermostat is typically connected to these temperature modifying systems via low voltage control wires, that are used to power a relay, turning the system on or off based upon the programming of the thermostat.

However, in many situations a localized temperature-modifying device such as a stand alone air conditioner or a space heater may be used to heat or cool one particular room or area. Many of these localized systems have the significant disadvantage that they are not programmable, and cannot take advantage of the energy efficiency and controllability that programmable thermostats offer. These localized temperature-modifying devices typically have just a temperature sensor and a switch, which actuates the heating/cooling unit in the event the sensed temperature falls/rises beyond the set point temperature.

Accordingly, a programmable temperature control system is needed that may be used with one or more of such systems to provide them with the benefits in reduced energy costs and controllability of other temperature control systems.

SUMMARY OF THE INVENTION

Embodiments of the invention may include a system for programmable temperature control in which a programmable controller may be programmed to control a thermal output of a temperature-modifying device having a power connector. In one embodiment, the programmable temperature control system may include at least one power coupler for removeably engaging the power connector from the temperature-modifying device. The programmable controller may be electrically coupled to the at least one power coupler and programmed to control the operation of the at least one temperature modifying device in response to the comparison of a measured temperature with at least one set point temperature.

The power coupler may comprise one or more electrical outlets on the programmable temperature control system, for example, that may be used to individually control heating and cooling devices. The power controller may also include a power coupler for removeably engaging a power supply, such as an electrical outlet.

BRIEF DESCRIPTION OF THE DRAWINGS

The foregoing and other aspects and advantages will be better understood from the following detailed description of the invention with reference to the drawings, in which.

DETAILED DESCRIPTION

The invention will be understood more fully from the detailed description given below and from the accompanying drawings of the preferred embodiments of the invention; which, however, should not be taken to limit the invention to a specific embodiment, but are for explanation and understanding only.

Figure 1:
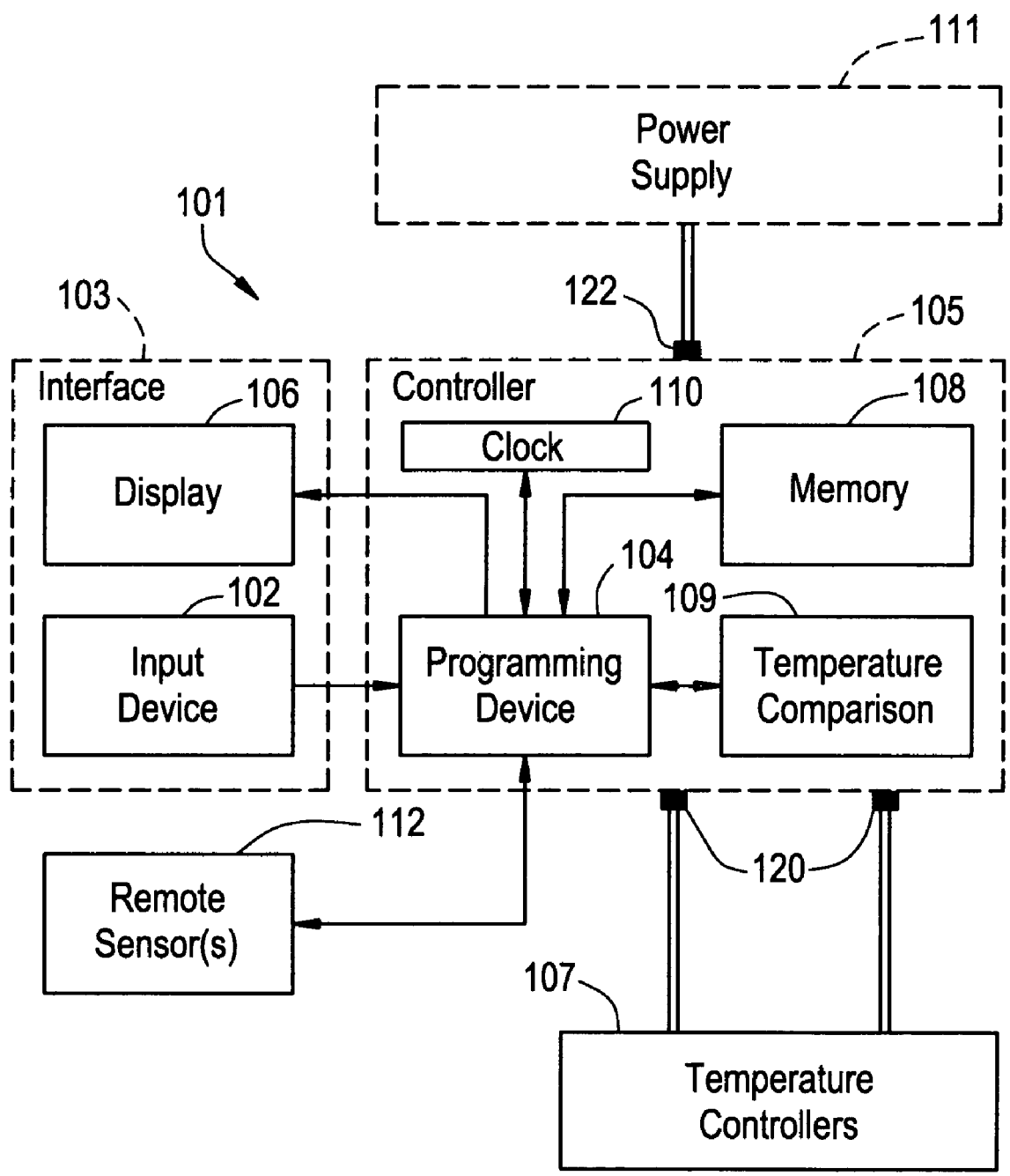
FIG. 1 is a block diagram of a programmable thermostat in accordance with aspects of the invention.

FIG. 1 contains a block diagram of an embodiment of a programmable thermostat. Those of ordinary skill in the art will appreciate that the invention is not limited thereto and may comprise any device or configuration of components capable of operating in the manner of the invention. In the embodiment disclosed herein, information regarding the desired set point temperature, date, or time for each program may be inputted to thermostat 101 by the user through input device 102 in interface 103. Interface 103 may be connected to a programming device 104 of controller 105 in such a way that programming device 104 receives information inputted at input device 102, and may display this information on display device 106.

Controller 105 may also be removeably engaged to one or more temperature-modifying devices 107, which are typically a localized heating or cooling system for the medium whose temperature is being controlled, such as a stand alone air conditioner, space heater, etc., Temperature-modifying devices 107 are not particularly limited, however, and may comprise any devices capable of being removeably connected to thermostat 101 through one or more power couplers 120. Power couplers 120 may comprise any mechanism for allowing thermostat 101 to be removeably engaged to temperature-modifying devices 107, such as a conventional plug and electrical outlet, male and female connectors, etc.

Because thermostat 101 is removeably connected to power supply 111, it has the significant advantage that it may be easily moved by the user from location to location, enabling it to be used with different temperature modifying devices at different times.

Programmable device 104 may store the information received from input device 102 in memory 108, along with an algorithm or program for controlling the operation of each temperature-modifying device 107 in accordance with this information. For example, in one embodiment, one power coupler 120 may be designated for a heating device, while another may be designated for a cooling device. Programmable device 104 may be programmed to activate the heating device during certain times of the year or under certain conditions, and may similarly be programmed to activate the cooling device.

Alternatively, programmable device 104 may be programmed to operate all of power couplers 120 during the time intervals, but to maintain the temperature within a certain range. For example, a heating device may be activated through one power coupler when the temperature drops below a set point temperature, while a cooling unit may be activated through another power coupler 120 if the temperature rises above a certain set point temperature. These are just some examples of the possible programming of the thermostat, and the invention is not limited as to the number and types of programs possible.

Programming device 104 may comprise any device capable of operating in the manner of the invention, such as a logic circuit on a logic board, a microprocessor, or other integrated circuit. Similarly, memory 108 may comprise electronic memory, such as RAM, SRAM, or DRAM, and the like, in an integrated circuit, such as a PROM, EPROM, or EEPROM and the like. Memory 108 may also form part of programming device 104. Display device 106 is also not particularly limited and may comprise, for example, an electronic display, such as an LCD, LED, and the like. Input device 102 may include pressure sensitive buttons, keypads, or any other device or arrangement of devices that are capable of entering the appropriate information. The operation of such devices is well known to those of ordinary skill in the art.

A comparison device 109 may be used to compare ambient temperature of the medium to be controlled with the desired control temperature, as determined by programming device 104 and stored in memory 108. Comparison device 109 may detect the current ambient temperature by using a conventional temperature-sensing device, such as a thermistor, thermocouple, or other type of temperature transducer.

A clock 110 may be connected with programming device 104 in order to provide time related information thereto for use in connection with the operation of programming device 104 and its program of temperature control. Time related information from clock 110 may also be stored in memory 108 and shown on display 106. Clock 110 may comprise any device for providing time related information, such as a voltage controlled oscillator (VCO), crystal oscillator, and the like, along with associated circuitry. The time related information provided by clock 110 is not limited and may comprise, for example, chronological time information, such as year, month, day, hour, minutes, and/or seconds, or synchronization information for programming device 104 (which may be used to calculate this information). Clock 110 may also form a part of programming device 104.

One or more remote sensors 112 may be used in communication with controller 105, such as to provide feedback information to programming device 104, such as temperature and humidity, or any environment-related information. Information may be transmitted to and from the sensor using any number of mechanisms, such as wireless systems (e.g., radio frequency or infrared), low voltage communication cabling, or even using household wiring. The invention is not limited in this regard.

The operation of controller 105 and/or interface 103 may be powered by power supply 111. Power supply 111 is not particularly limited, but may comprise any source of power capable of operating controller 105 and interface 103, such as household current (e.g., 120 v AC at 60 Hz). Power supply 111 may be removeably engaged to controller 105 through power coupler 122. As with power coupler 120, power coupler 122 may comprise any mechanism for allowing thermostat 101 to be removeably engaged to power supply 111, such as a conventional plug and electrical outlet, male and female connectors, etc.

Figure 2A:
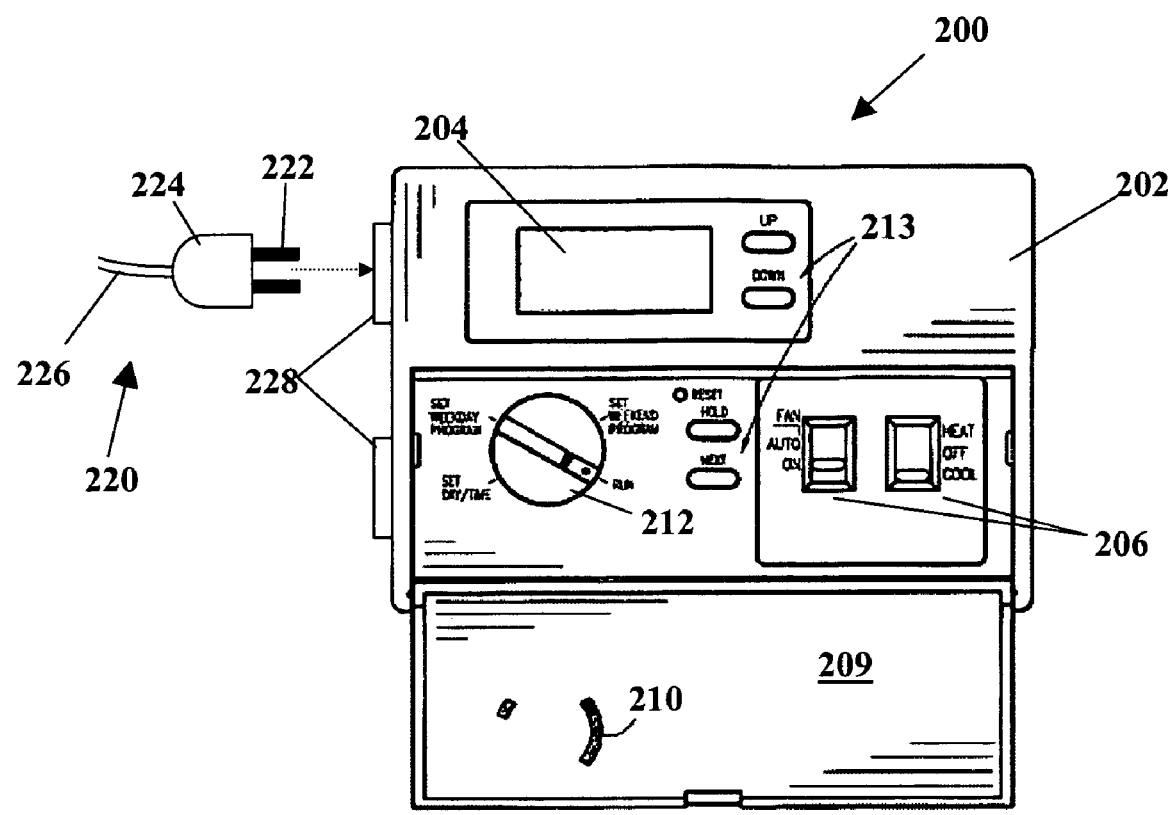
FIGS. 2(a) and 2(b) are front and side elevations, respectively, of a programmable thermostat in accordance with aspects of the invention.
Figure 2B:
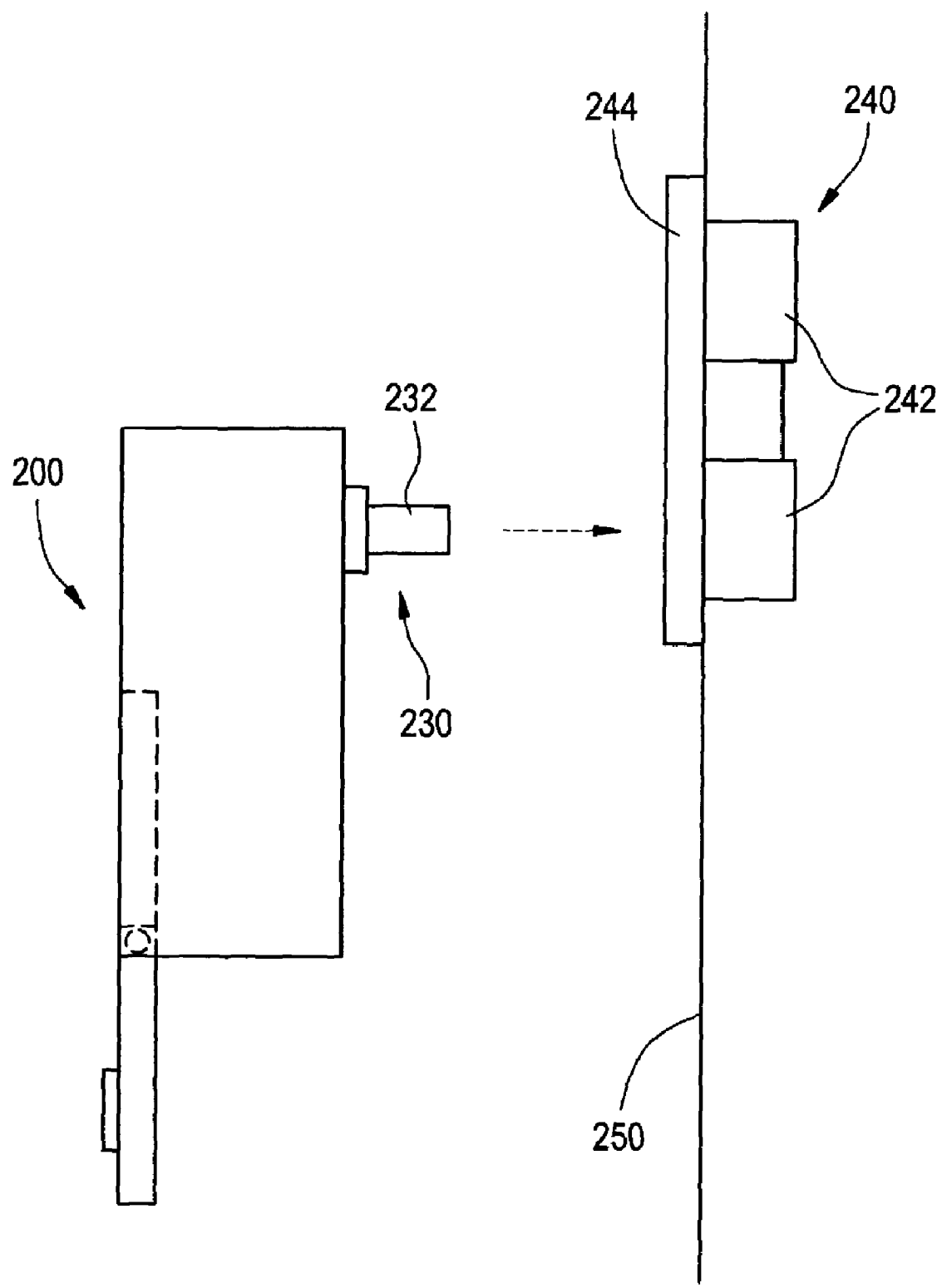

FIGS. 2(a)–(b) also illustrate an example of a programmable thermostat in accordance with aspects of the invention. As shown in FIG. 2(a), thermostat 200 may include an outer casing 202 to house the aforementioned components. Display window 204 maybe used for housing display 106 (FIG. 1) for interaction with the user. Switches 206 maybe used for switching between heating and cooling modes, or for switching an air handling fan from automatic mode to a constant "on" mode. Buttons 213 may further be used for inputting information into the thermostat, with information being presented through display window 204. Switches 206 and buttons 213 may be in communication with input device 102 (FIG. 1) for inputting information into the programmable thermostat. Of course, these aspects of programmable thermostats temperature control are well known in the art and will not be further elaborated upon here.

Thermostat 200 may also include rotary dial 212, or some other mechanism, for switching between operation modes of the thermostat, such as the setting of the day and time, setting weekday and weekend functions, setting the filter, and running, and may also be in communication with input device 102 (FIG. 1). Of course, those of ordinary skill in the art will appreciate that it is not necessary to use a rotary dial and that any other mechanism, such as a combination of switches and buttons may be used to achieve the functionality described herein.

In the embodiment shown in FIG. 2(a), thermostat 200 may be connected to one or more temperature-modifying devices via one or more electrical power connectors 220. As shown in FIG. 2(a), in one embodiment, a power connector 220 may comprise power cord 226, which is terminated in plug 224, having conductive prongs 222. Power connectors 220 may be inserted into one or more outlets 228 on thermostat 200. Outlets 228 may be electrically connected to controller 105 (FIG. 1) in a conventional manner, so that controller 105 may control the flow of power to the temperature-modifying devices in accordance with the programming of programmable device 104 (FIG. 1), as previously discussed.

As shown in FIG. 2(b), thermostat 200, in turn, may be removeably connected to a source of power (e.g., power supply 111—FIG. 1) via power connector 230. In the embodiment illustrated in FIG. 2(b), power connector 230 may comprise conductive prongs 232, which may be electrically connected to controller 105 (FIG. 1) of thermostat 200 in a conventional manner. Conductive prongs 230 may be configured, for example, for insertion into an electrical outlet 240, which may include one or electrical receptacles 242. In a typical configuration, outlet 240 may be mounted in a wall 250 and covered with a faceplate 244, as shown.

Figure 3A:
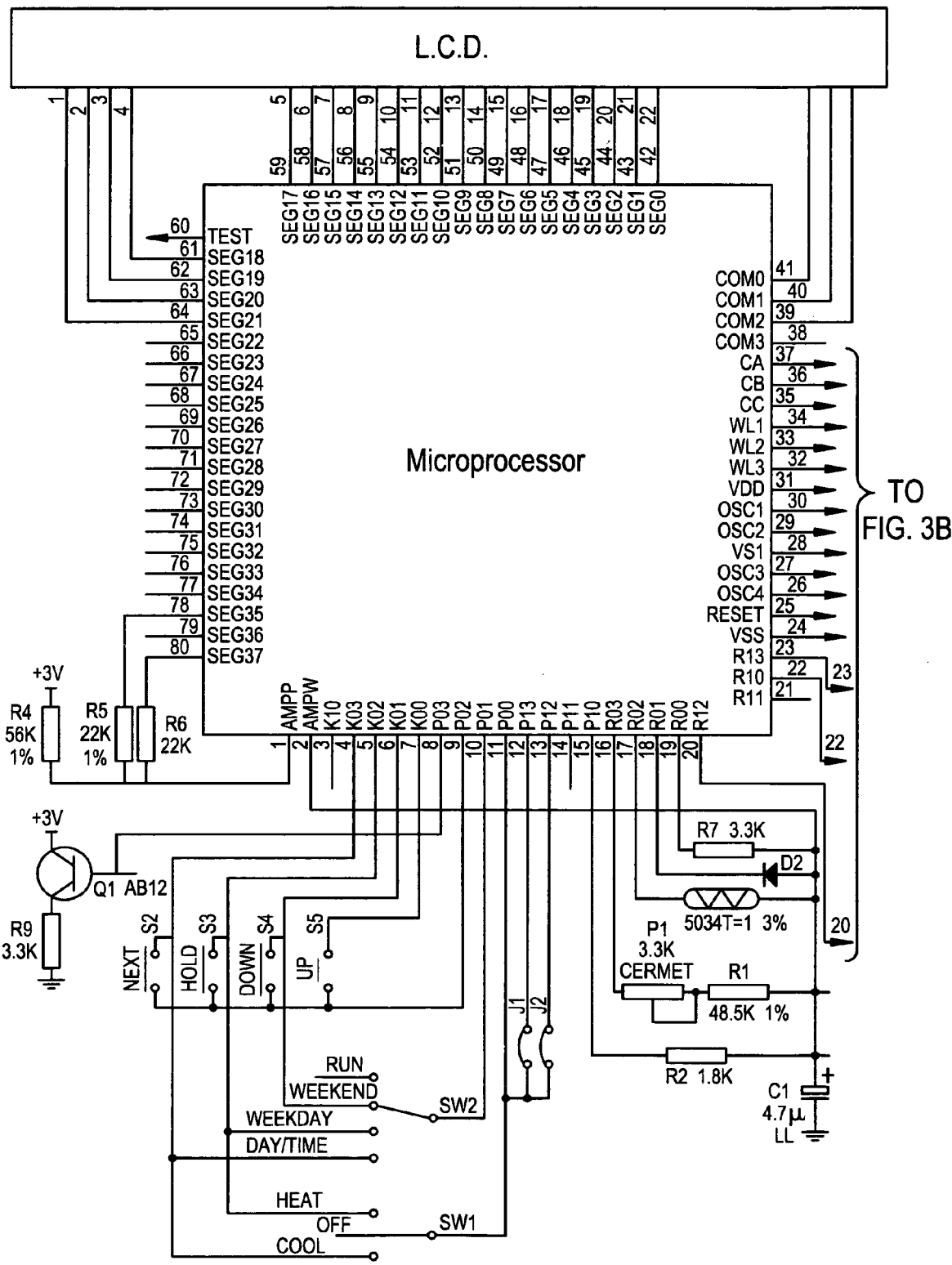
FIGS. 3(a)–(b) are a schematic of a programmable thermostat.
Figure 3B:
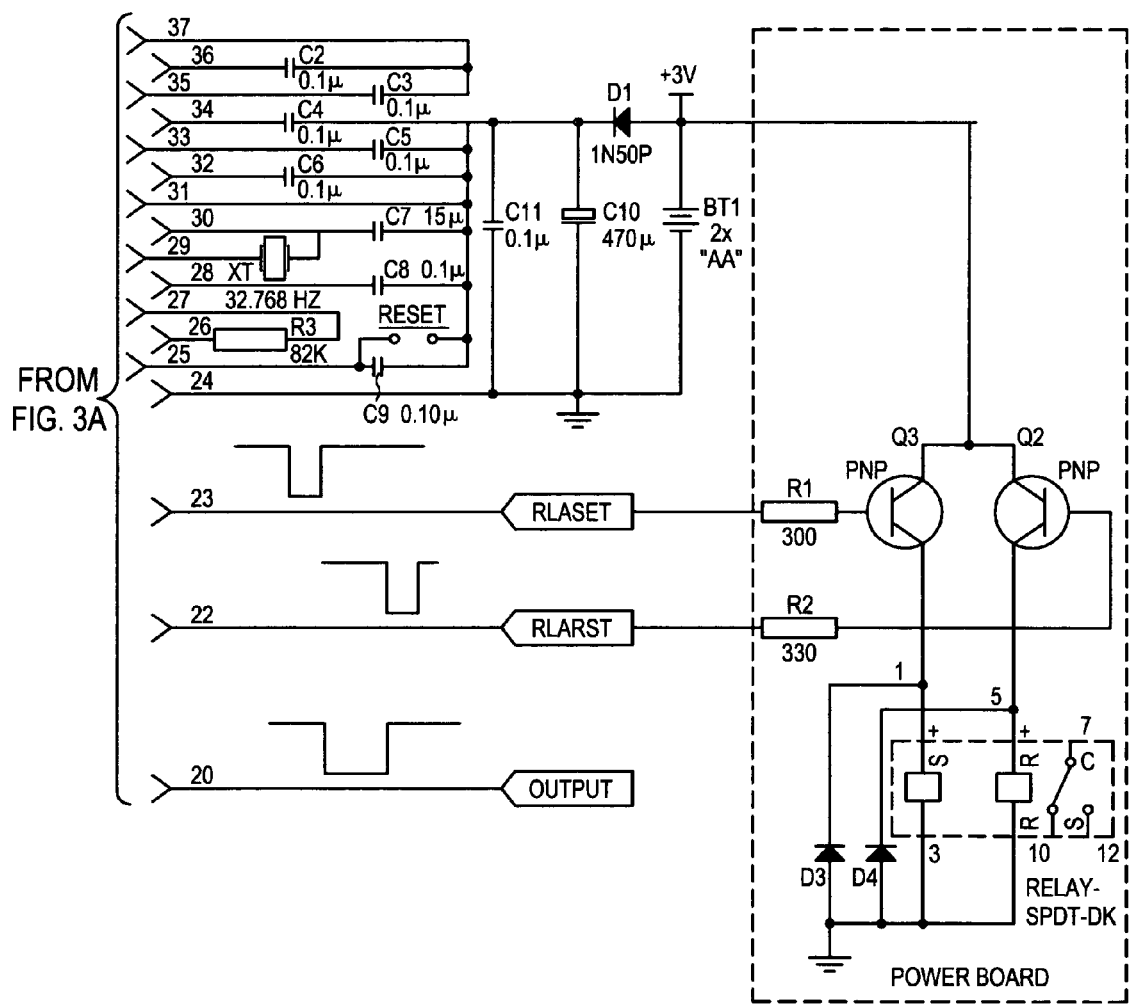

A schematic an embodiment of a controller 105 of the invention for use with the aforementioned temperature control, fan control, and filter usage counter is illustrated in FIGS. 3(a)–(b). As shown in FIGS. 3(a)–(b), a microprocessor may be powered by a DC power board, and, in turn, power an LCD display. The microprocessor may have a plurality of outputs to individual segments on the LCD display for outputting information thereto to be viewed by the user. The microprocessor may also include the plurality of inputs/outputs to a temperature modifying device and to a series of switches (e.g., next, hold, down, and up). One of these switches SW2, may be selectable in this example, between a weekday program, a weekend program, date and time selection, setting the fan control information, and running or operating the thermostat. By selecting one of these positions in SW2, the user may designate which aspect of the programming (e.g., temperature control, etc.) setting may be inputted into the microprocessor using the remaining switches. Of course, those of ordinary skill in the art will appreciate that this is only one possible embodiment of the invention and is not limited thereto.

While the invention as disclosed herein has been described in relation to specific embodiments thereof, it is understood that the invention is not limited to the particular embodiment disclosed herein, but only as set forth in the appended claims. It will be appreciated that various components known to those of skill in the art may be substituted for those described herein without departing from the spirit and scope of the invention as set forth in the appended claims. For example, the input device may include a pressure keypad or a series of contact switches instead of the pressure switches disclosed herein. The display device may also include an LED display or other illuminated display mechanisms, or any of a number of conventional mechanical display mechanisms such as gauges or the like. The invention may be used in connection with any device that controls temperature.

What is claimed is:

1. A programmable temperature control apparatus for controlling the operation of at least one temperature-modifying device having a power connector, said apparatus comprising:
   at least one power coupler for removeably engaging said power connector from said temperature-modifying device;
   a temperature sensor; and
   a programmable controller electrically coupled to said at least one power coupler and the temperature sensor and programmed to control the operation of said at least one temperature modifying device in response to a comparison of a measured ambient temperature from the temperature sensor with at least one set point temperature.

2. The apparatus of claim 1, further comprising:
   at least one removeably engageable power coupler for electrically connecting said programmable controller to a power supply.

3. The apparatus of claim 2, wherein said power supply comprises an electrical outlet.

4. The apparatus of claim 1, wherein said at least one power coupler comprises an electrical outlet.

5. The apparatus of claim 1, wherein said temperature-modifying device comprises one or more selected from the group consisting of an air conditioner and a space heater.

6. The apparatus of claim 1, comprising a plurality of said power couplers, wherein said programmable controller is programmed to individually control each of said power couplers for either a heating device or a cooling device.

7. The apparatus of claim 6, wherein said programmable controller is programmed to activate said heating device if said temperature falls below a set point temperature and to operate said cooling device if said temperature rises above said set point temperature or another set point temperature.

8. The apparatus of claim 1, wherein said programmable controller comprises a programming device for implementing a temperature control program, a memory for storing said temperature control program and temperature related information, a temperature comparator for comparing said ambient temperature with said set point temperature.

9. The apparatus of claim 8, wherein said programmable device comprises one or more selected from the group consisting of a logic circuit on a logic board, a microprocessor, and an integrated circuit.

10. A programmable temperature control apparatus for controlling the operation of at least one temperature-modifying device having a power connector, said apparatus comprising:
    at least one outlet for removeably engaging said power connector from said temperature-modifying device;
    a temperature sensor; and
    a programmable controller electrically coupled to said at least one electrical outlet and the temperature sensor and programmed to control the operation of said at least one temperature modifying device in response to the comparison of a measured ambient temperature from the temperature sensor with at least one set point temperature.

11. The apparatus of claim 10, further comprising:
    at least one removeably engageable power coupler for electrically connecting said programmable controller to an electrical outlet.

12. The apparatus of claim 10, wherein said temperature-modifying device comprises one or more selected from the group consisting of an air conditioner and a space heater.

13. The apparatus of claim 10, comprising a plurality of said outlets, wherein said programmable controller is programmed to individually control each of said outlets for either a heating device or a cooling device.

14. The apparatus of claim 13, wherein said programmable controller is programmed to activate said heating device if said temperature falls below a set point temperature and to operate said cooling device if said temperature rises above said set point temperature or another set point temperature.

15. The apparatus of claim 10, wherein said programmable controller comprises a programming device for implementing a temperature control program, a memory for storing said temperature control program and temperature related information, a temperature comparator for comparing said ambient temperature with said set point temperature.

16. The apparatus of claim 15, wherein said programmable device comprises one or more selected from the group consisting of a logic circuit on a logic board, a microprocessor, and an integrated circuit.

17. A programmable temperature control apparatus for controlling the operation of at least one temperature-modifying device having a power connector, said apparatus comprising:
    at least one outlet for removeably engaging said power connector from said temperature-modifying device;
    a temperature sensor;
    a programmable controller electrically coupled to the temperature sensor and the at least one electrical outlet and programmed to control the operation of said at least one temperature modifying device in response to comparison of a measured ambient temperature from the temperature sensor with at least one set point temperature; and
    at least one removeably engageable power coupler for electrically connecting said programmable controller to an electrical outlet.

18. The apparatus of claim 17, comprising a plurality of said outlets, wherein said programmable controller is programmed to activate a heating device if said temperature falls below a set point temperature and to operate a cooling device if said temperature rises above said set point temperature or another set point temperature.

19. A method for the programmed control of at least one temperature-modifying device having a power connector, said method comprising the steps of:
 providing a programmable controller that is electrically connected to a temperature sensor and at least one power coupler for removeably engaging said power connector from said temperature-modifying device; and
 configuring said programmable controller to be user programmable to control the operation of said at least one temperature modifying device in response to comparison of a measured ambient temperature from the temperature sensor with at least one set point temperature.

20. A programmable temperature control apparatus for controlling the operation of at least one temperature-modifying device having a power connector, said apparatus comprising:
 at least one power coupler for removeably engaging said power connector from said temperature-modifying device; and
 a programmable controller electrically connected to a temperature sensor and electrically coupled to said at least one power coupler and programmed to control the operation of said at least one temperature modifying device in response to comparison of a measured ambient temperature from the temperature sensor with at least one set point temperature.

21. The apparatus of claim 20, further comprising at least one external temperature sensor operatively connected to said programmable controller for sensing said ambient temperature.

* * * * *